(12) United States Patent
Walchle et al.

(10) Patent No.: US 8,756,955 B2
(45) Date of Patent: Jun. 24, 2014

(54) PARACORD BRACELET WITH SHACKLE CONNECTOR

(75) Inventors: Kurt Walchle, Ponte Vedra Beach, FL (US); Matthew Bridgewater, Saint Johns, FL (US); Jason Sarnowski, Jacksonville, FL (US); Cole Coker, Jacksonville, FL (US)

(73) Assignee: Tough Gear, Inc., Ponte Vedra Beach, FL (US)

( * ) Notice: Subject to any disclaimer, the term of this patent is extended or adjusted under 35 U.S.C. 154(b) by 118 days.

(21) Appl. No.: 13/409,591

(22) Filed: Mar. 1, 2012

(65) Prior Publication Data

US 2012/0159987 A1 Jun. 28, 2012

Related U.S. Application Data (60) Provisional application No. 61/470,560, filed on Apr. 1, 2011.

(51) Int. Cl.
*A44C 5/20* (2006.01)
*A44B 11/00* (2006.01)

(52) U.S. Cl.
USPC ............. 63/3.2; 63/3.1; 24/574.1; 24/573.11; 24/DIG. 35; 403/79; 403/324

(58) Field of Classification Search
None
See application file for complete search history.

(56) References Cited

U.S. PATENT DOCUMENTS

| | | | |
|---|---|---|---|
| 575,032 A | 1/1897 | Kimbrell | |
| 1,608,807 A * | 11/1926 | Ogush | ............................. 24/656 |
| 2,449,593 A | 9/1948 | Drake | |
| 4,102,124 A | 7/1978 | Swager | |
| 4,164,378 A | 8/1979 | Linehan | |
| 5,046,881 A | 9/1991 | Swager | |
| 5,386,593 A | 2/1995 | Kleinman | |
| 5,678,282 A * | 10/1997 | Stewart | ........................... 24/68 J |
| 6,470,708 B1 | 10/2002 | Green | |
| 6,652,012 B1 | 11/2003 | Fuller et al. | |
| 7,712,155 B1 | 5/2010 | Pantoja | |

OTHER PUBLICATIONS

International Search Report issued May 30, 2012 in International Application No. PCT/US2012/027270, filed Mar. 1, 2012.
M. Carter Brown, "Survival Bracelets, Lanyards, & More," 11 pages, Aug. 14, 2008.
Pamela Wyant, "Survival Straps Survival Bracelet," 6 pages, Jun. 2, 2009.
The BeadSmith, "Beads and Findings 2008-2009," 4 pages, 2008.

* cited by examiner

*Primary Examiner* — Jack W. Lavinder
(74) *Attorney, Agent, or Firm* — Seyfarth Shaw LLP (57) ABSTRACT

A article of survival equipment for wear by the user comprising a weaved cord portion, a shackle, a tongue and a pin. The shackle is coupled to one end of the cord portion and further includes two apertures disposed at opposing ends of the shackle adapted to receive a pin. The tongue is coupled to the other end of the cord portion and is disposed between the ends of the shackle. The tongue further includes a plurality of apertures for receiving the pin. The pin extends substantially between the shackle apertures when inserted in the shackle and the tongue.

34 Claims, 7 Drawing Sheets

PARACORD BRACELET WITH SHACKLE CONNECTOR

CROSS-REFERENCE TO RELATED APPLICATIONS

This application claims the priority of, and hereby incorporates by reference, provisional application Ser. No. 61/470,560, filed Apr. 1, 2011.

FIELD OF THE INVENTION

The present invention relates generally to survival equipment and, in particular, to equipment with a connecting shackle.

BACKGROUND

Currently, it is known to weave high-strength, durable cord, such as paracord, into bracelets, necklaces and other articles. The paracord is weaved such that an individual wearing the item can unweave the paracord in a relatively easy manner and utilize the paracord in an emergency situation. Wearing the paracord as a bracelet, necklace, belt, or other item provides access to the cord wherever it is worn in the event an emergency situation arises.

A predetermined length of paracord is used and selected based on the intended wearer's sizing, and weaved to a length appropriate for the particular piece of article to be worn. Because the paracord is typically high-strength, military grade paracord, the cord is not designed to stretch any significant amount. The additional strength added by weaving the paracord increases resistance to stretching. As such, the length of the paracord and the size of the article produced from the paracord must be perfectly sized to fit the individual wearing it. Moreover, any increase or decrease in the size of the individual cannot be accommodated by the item, requiring a new paracord article to be purchased at a different size.

Typically, the ends of the paracord are joined by a common stainless steel shackle. The shackle includes a U-shaped portion and steel pin for enclosing the ends of the paracord within the shackle. The shackle has two holes for inserting a locking pin. Generally, only one shackle hole is threaded and engages the threaded portion of the pin when the pin is fully inserted. The opposing hole is non-threaded, fixedly securing the pin in the shackle. Thus, the paracord length and shackle must be sized an appropriate length to accommodate the wearer's dimensions.

The paracord and shackle are adapted to withstand a high amount of tensile force. However, because of the strength of the paracord, when the paracord article is worn, for example as a bracelet, the high-strength materials can present a significant safety hazard to the wearer if the bracelet becomes lodged or hooked on something, for example, a hook or chain. The paracord of the item being worn will not give way unless under excessive force. The individual wearing the item could potentially suffer bodily harm before the material of the item succumbs to the force applied.

Additionally, currently manufactured pins for shackles contain a flat head containing sharp edges likely to snag on clothing or other items.

Accordingly, there has been a need for an improved mechanism for clasping paracord articles that permits the size of the item to be adjusted by the individual wearing it. Additionally, there has been a need for a safety mechanism which permits the paracord article to break away when excessive force is applied to negate injury to the wearer.

SUMMARY OF THE INVENTION

In accordance with an aspect of the current invention, a paracord article including a cord portion and a connecting mechanism is disclosed. The connecting mechanism joins the opposing ends of the cord portion and further comprises a shackle, a tongue, and a pin. In an embodiment, the pin has a knurled head and is removable from the shackle.

The tongue contains axially aligned apertures for receiving the pin between the two ends of the shackle. The tongue permits the length of the paracord article to be adjusted. In an embodiment, the tongue may permit adjustment to three differing lengths. Further, the tongue may permit adjustment in one-quarter inch increments.

In another embodiment, a paracord article comprising a cord portion and a connecting mechanism is disclosed. The connecting mechanism joins two opposing ends of the cord portion and further includes a shackle and a pin adapted to shear or break if the cord gets snagged while worn by a user before bodily harm. In an embodiment, the pin contains a groove disposed on the shaft of the pin to permit shearing of the pin when a substantial force is applied in order to minimize potential harm to a wearer.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its constructions and operation, and many of its advantages should be readily understood and appreciated.

FIG. 4 is a front cross-sectional view of the shackle, tongue and pin of FIG. 1, taken along line 4 in FIG. 4a.

FIG. 6 is a front cross-sectional view of a shackle, adjustable tongue, and a threaded break-away pin in FIG. 5, taken along line 6 in FIG. 6a.

FIG. 12 is a front cross-sectional view of a shackle, adjustable tongue and clevis break-away pin in FIG. 11 during insertion of the pin into the shackle and tongue, taken along line 12 in FIG. 12a.

DETAILED DESCRIPTION

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Figure 1:
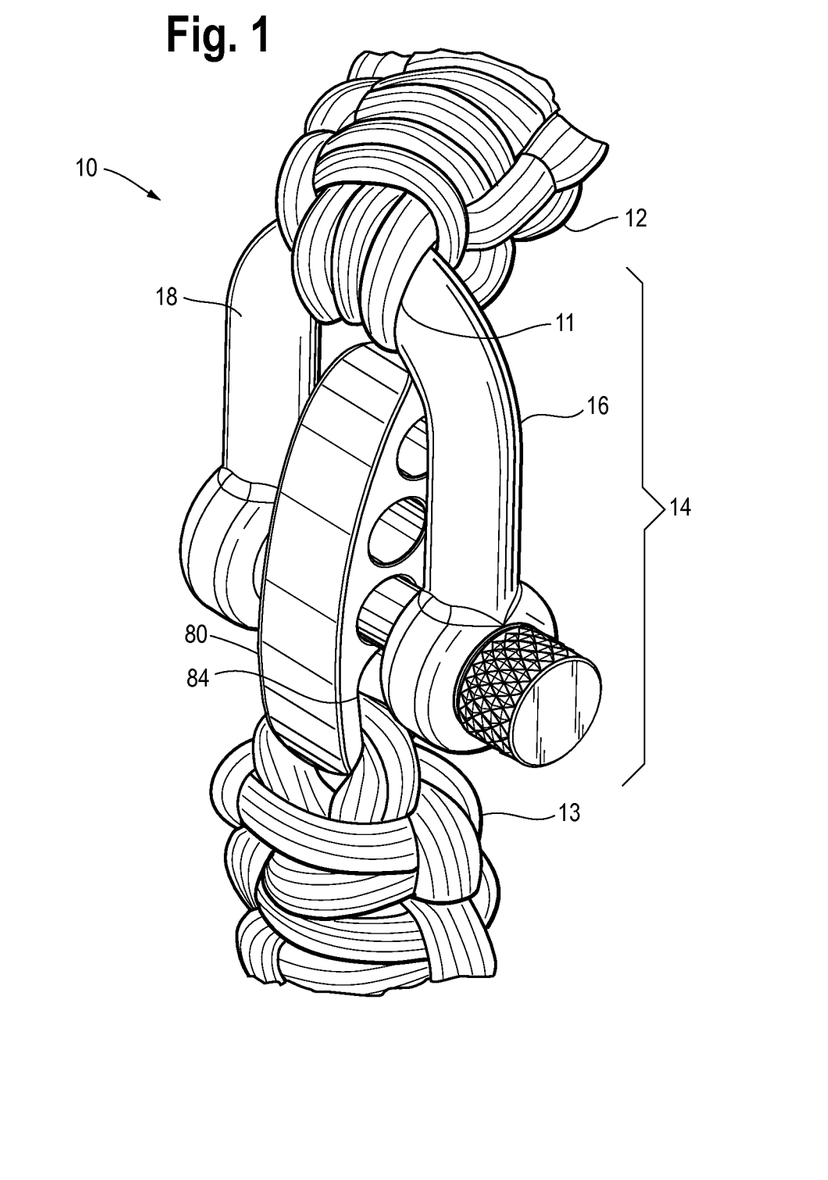
FIG. 1 is a front perspective view of an embodiment of a paracord bracelet, a shackle, adjustable tongue, and a threaded pin of the present invention.
Figure 2:
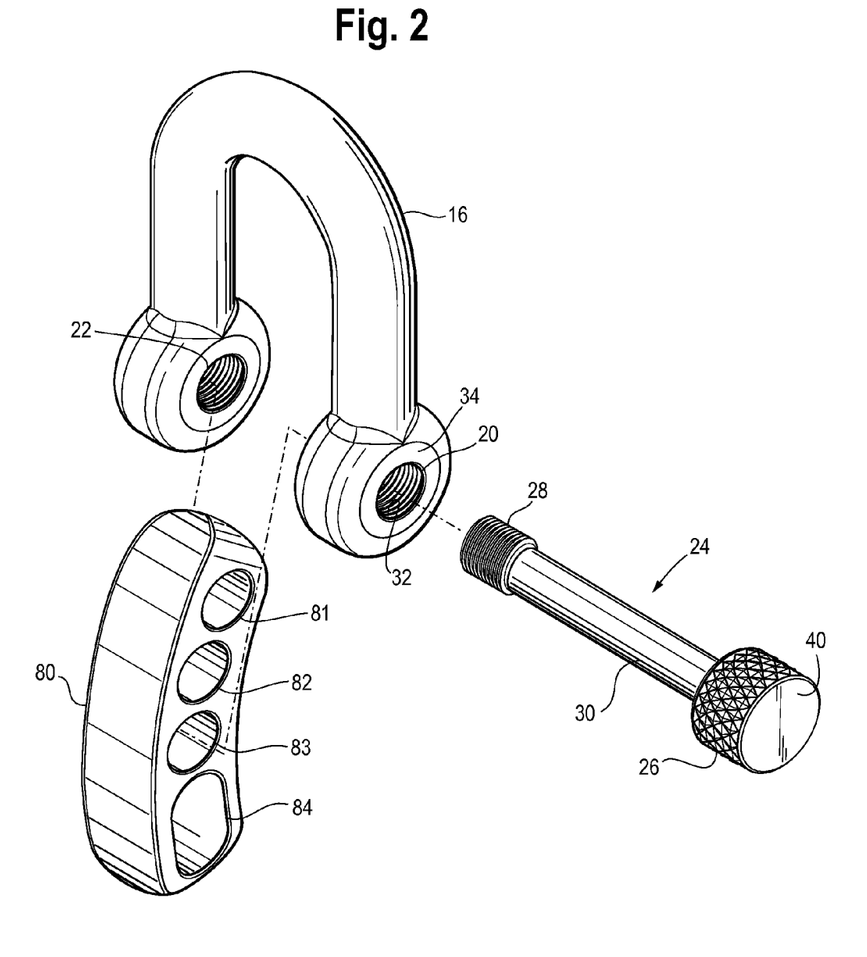
FIG. 2 is an exploded perspective view of the shackle, tongue and pin in FIG. 1.
Figure 3:
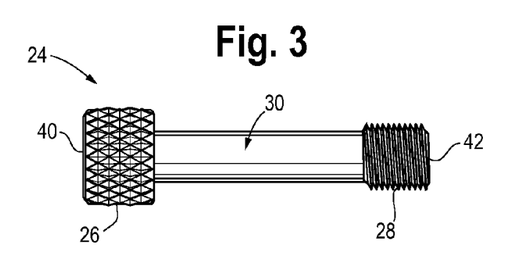
FIG. 3 is a side view of the pin of FIG. 1.

Referring to FIGS. 1 and 2, a cord bracelet 10 for use in emergency situations is shown. The bracelet includes a cord portion 12 and a connecting mechanism 14. While the present invention will be described in the form of a bracelet for wearing around an individual's wrist, it will be appreciated that the present invention is capable of use in many forms, including watch bands, anklets, belts, necklaces, dog collars, hat bands, and other items of articles which can be readily made from paracord while not departing from the scope and spirit of the present invention. It will be also be appreciated that while the present application discloses the use of a paracord as an embodiment of the invention, any type of cording, yarn or other material can be used without departing from the scope and spirit of the present application.

In an embodiment, the cord portion 12 is weaved to a length suitable for wearing around a user's wrist. The cord portion 12 is capable of multiple widths, requiring additional cord to weave to the appropriate length. In an embodiment, the total paracord length required for weaving into the bracelet is, for example, approximately 10 to 28 feet. It will be appreciated that any length of paracord may be used. Additionally, in an embodiment, the cord 12 is a nylon kernmantle cord, such as military specification 550 paracord.

At one end 11 of the cord portion 12 is a generally U-shaped shackle 16. In an embodiment, the cord 12 is looped around the arcuate portion 18 of the shackle 16 multiple times, as is generally known in the art.

Figure 4:
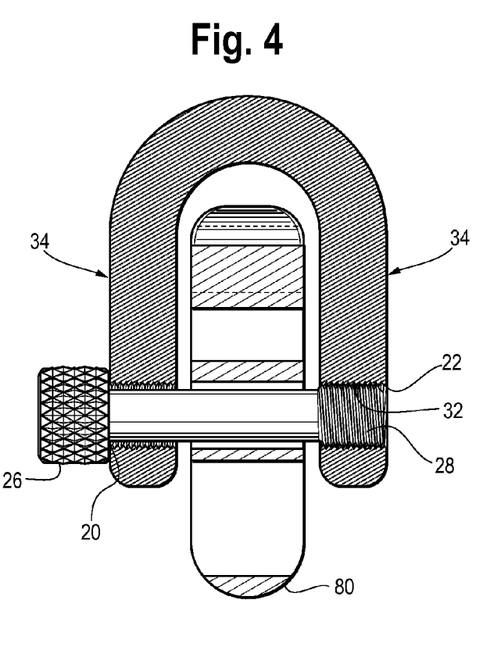
Figure 4A:
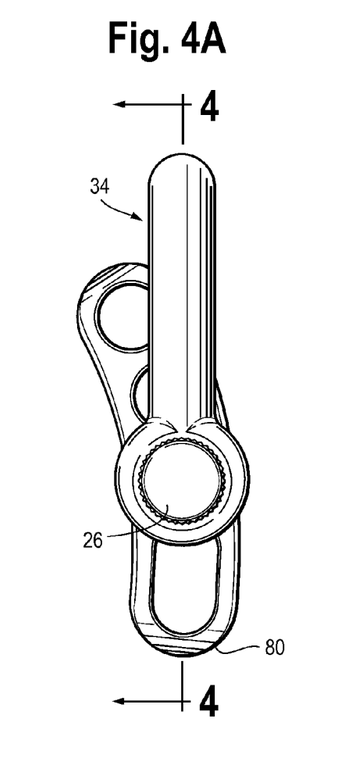
FIG. 4a is a side view of the shackle, tongue and pin in FIG. 1.

In an embodiment, shackle 16 includes ends 19, 21 respectively having apertures 20 and 22 for retaining a pin 24. In an embodiment, the inner walls of apertures may include threads 32. The pin 24 contains a head 26 at a first end 40, a threaded portion 28 at the second end 42 adapted to threadably engage the threads 32 of apertures 20 and 22, and a shaft 30 disposed between the two head 26 and threads 28. When installed, the shaft 30 extends between the two apertures 20 and 22 in the shackle 16. The head 26 is sized larger than the diameter of the aperture 20 such that the head 26 abuts the shackle outside edge 34 and retains the pin 24 in the aperture 20, preventing the pin 24 from passing completely through both apertures 20 and 22 in the shackle 16. In an embodiment, the head 26 of the pin 24 is knurled to provide a gripping means when inserting or removing the pin 24, as shown in FIG. 4. Additionally, the knurled head 26 prevents snagging on clothing and the like which frequently occurs when using a flat headed pin commonly used in other shackles. The threaded end 28 is adapted to engage the interior threads 32 of the apertures 20 and 22. Because both apertures 20 and 22 are threaded, the pin can be completely removed by engaging the threaded portion 28 of the pin 24 with the interior threads 32 of the apertures 20 and 22. Accordingly, the pin 24 can be replaced with a different pin. When the pin 24 is completely inserted in the apertures 20 and 22, the second end 42 of the pin 24 lies substantially flush with the outside edge 34 of the shackle 16 and the head 26 abuts the shackle 16, as shown in FIG. 4. In an embodiment, the pin 24 and shackle 16 are each made of metal, such as stainless steel. Alternatively, the shackle may be composed of plastic, carbon fiber or other metal.

Figure 5:
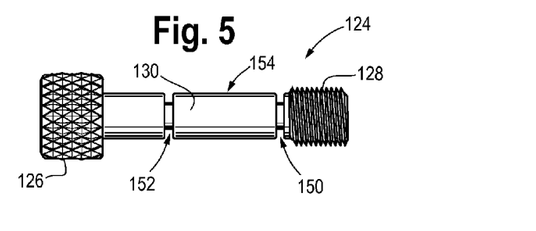
FIG. 5 is a side view of another embodiment of a threaded break-away pin in accordance with the present invention.
Figure 6:
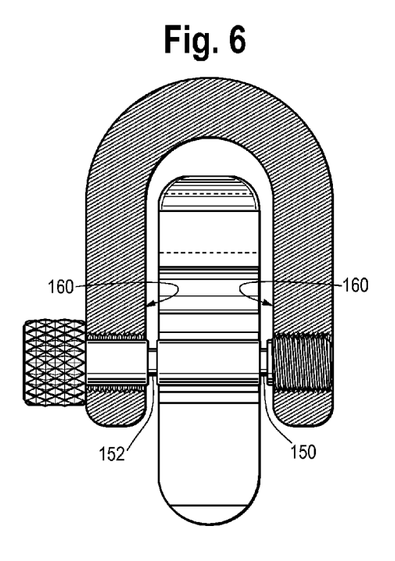
Figure 6A:
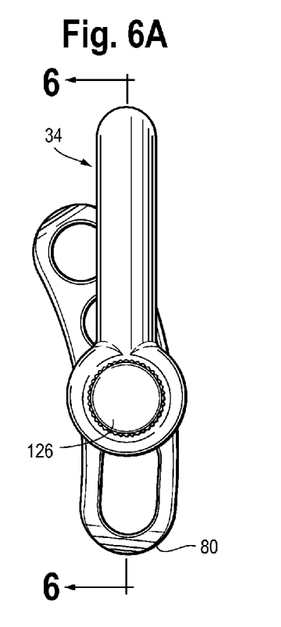
FIG. 6a is a side view of the shackle, tongue and pin in FIG. 5.
Figure 7:
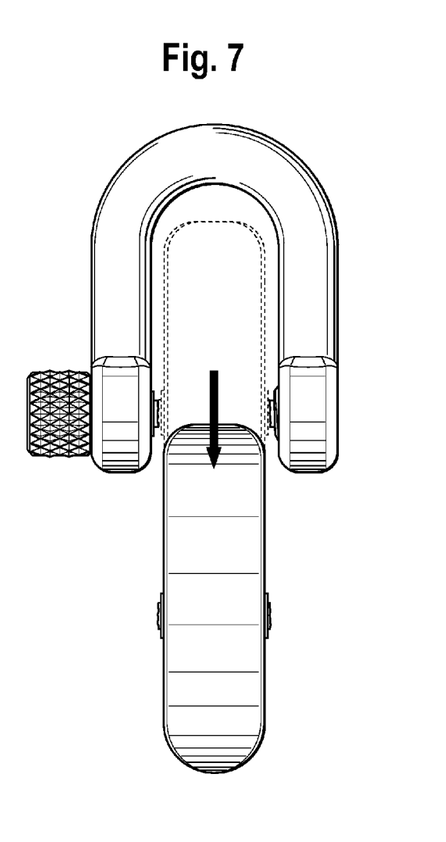
FIG. 7 is a front view of a front view of the shackle, tongue and pin of FIG. 6 after the pin is broken.

In another embodiment, the pin 124 is a break-away pin, as shown in FIGS. 5 and 6. The head 126 of the pin 124 may be knurled to provide a gripping means when inserting or removing the pin 124. The pin 124 may include an annular groove 150 circumferentially disposed on the shaft 130. The groove 150 extends radially inwardly from the outside surface 154 of the shaft 130. As such, the groove 150 functions as a weakened break-away feature for the bracelet 10 by shearing at the groove 150 location when a lateral force is applied to the pin 124, such as, for example, when the article worn by a user gets snagged on something. In another embodiment, a plurality of annular grooves 150, 152 are circumferentially disposed on the shaft 130. The first groove 150 is disposed adjacent the threaded end portion 128. The second groove 152 is disposed adjacent to the head 126. The grooves 150, 152 are configured so that the grooves 150, 152 substantially align with the interior edge 160 of the shackle 116 when the pin 124 is substantially inserted into the shackle 16, such as when the article is worn by a user. The alignment of the grooves 150, 152 with the interior edge 160 of the shackle 16 creates a shear plane. When a substantial lateral force is applied to the pin 124, the pin 124 will preferably shear at one or more of the grooves 150, 152, decoupling the tongue 80 from the shackle 116 to avoid or minimize injury to a wearer, as shown in FIG. 7.

In an embodiment, the pin 124 shears at one or more of the groove locations when approximately 30 to 100 pounds of lateral force is applied. In an embodiment, the pin 124 shears at approximately 60 pounds. When broken, the pin 124 preferably disassembles into multiple pieces corresponding to the portions outside of the grooves and the portion disposed between the grooves, thereby causing the article to fall apart before harm is caused to the user. In an embodiment, the pin 124 is constructed of a plastic.

Figure 8:
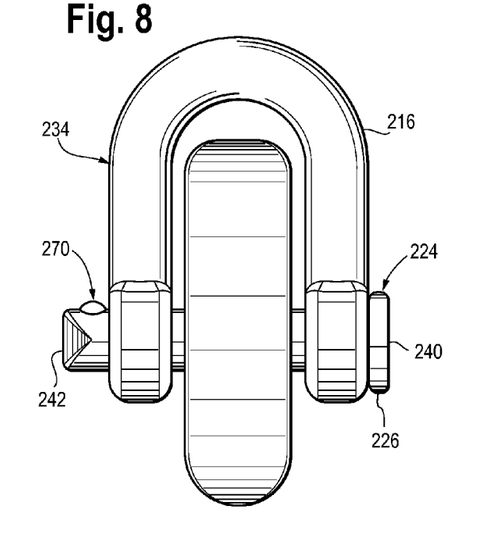
FIG. 8 is a front view of a shackle, adjustable tongue, and clevis pin.
Figure 9:
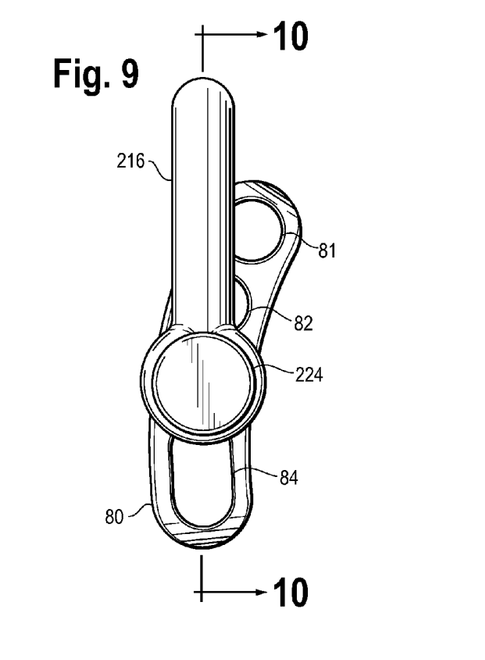
FIG. 9 is a side view of the shackle, tongue and pin in FIG. 8.
Figure 10:
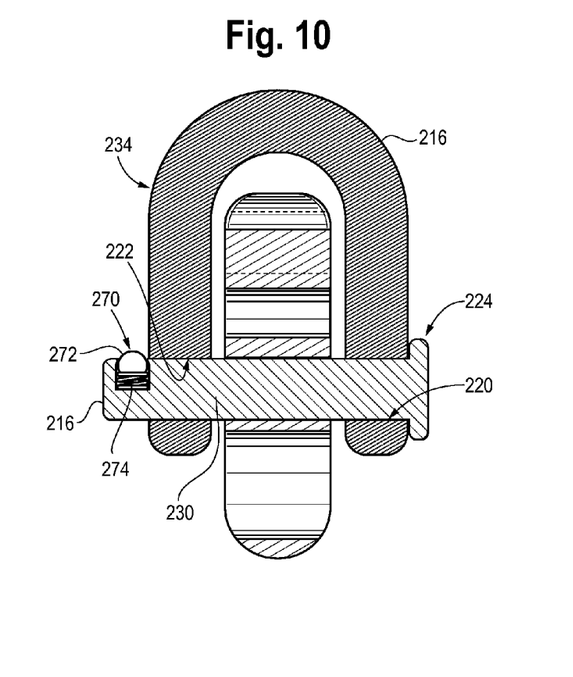
FIG. 10 is a front cross-sectional view of the shackle, tongue and pin in FIG. 9, taken along line 10 in FIG. 9.

In another embodiment, the pin may be a clevis pin 224, as depicted in FIGS. 8-10. The clevis pin 224 may be constructed of metal, such as, for example, stainless steel, or plastic, carbon fiber or other material. The clevis pin 224 includes a flat head 226 at a first end 240 and a detent structure 270 disposed at a second end 242. In an embodiment, the head 226 of the pin 224 is knurled to provide a gripping means when inserting or removing the pin 224. In an embodiment, the detent structure 270 may include a ball bearing 272 extending radially from the pin shaft 230 and a spring 274 adapted to radially bias the ball 272 outwardly. The width of the shaft 230 and the detent structure 270 are slightly wider than the diameter of the apertures 220, 222. The detent structure 270 is depressible when a force is applied such that the clevis pin 224 can pass through apertures 220, 222 when the detent structure is depressed. In an embodiment, apertures 220 222 in the shackle 216 do not include threads. As the clevis pin 224 is inserted into apertures 220, 222 of the shackle 216, the detent structure 270 is depressed due to the force applied by the inner walls of apertures 220 and 222. When the clevis pin 224 is substantially inserted into the shackle 216, the second end 242 of the pin 224 extends beyond the outside edge 234 of the shackle 216 and the detent structure 270 is biased outwardly. The detent structure 270 thereby substantially prevents the pin 224 from being inadvertently removed from the shackle 216 without a force sufficient to depress the detent structure 270 while passing through apertures 220, 222.

Figure 11:
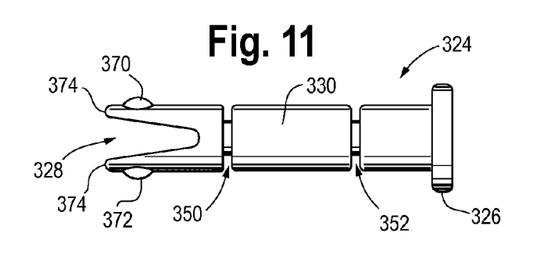
FIG. 11 is a side view of a clevis break-away pin.
Figure 12:
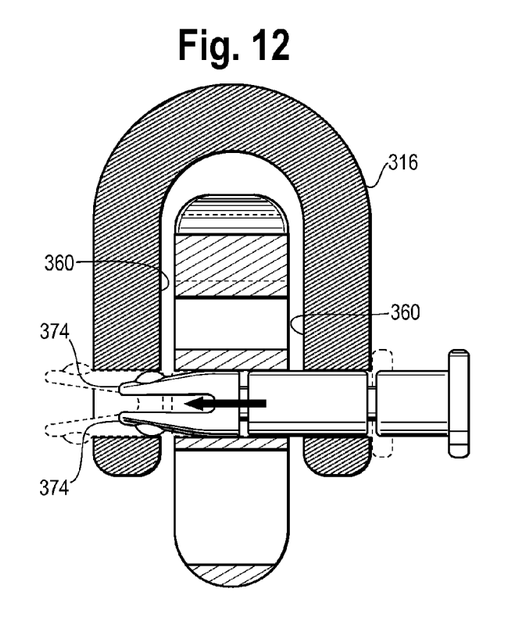
Figure 12A:
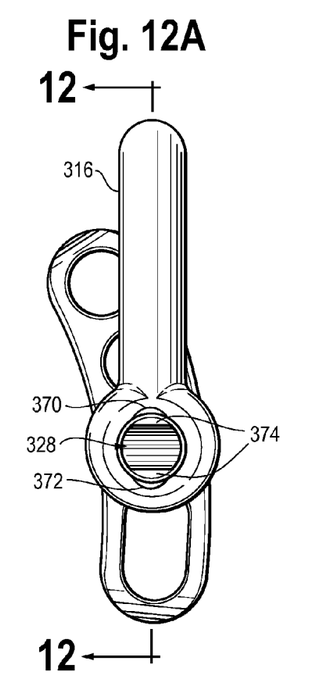
FIG. 12a is a side vide of the shackle, tongue and pin in FIG. 11.
Figure 13:
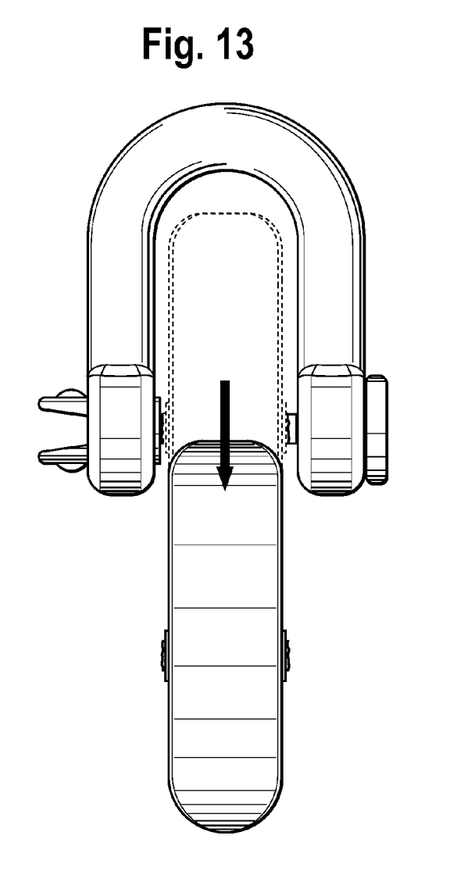
FIG. 13 is a front view of the shackle, tongue and clevis break-away pin of FIG. 12 after the pin is broken.

In another embodiment, the pin 324 is a break-away pin, as shown in FIGS. 11-13. In an embodiment, the pin 324 may be constructed of a plastic. The pin 324 may include an annular groove 350 circumferentially disposed on the shaft 330. In another embodiment, a plurality of annular grooves 350 and 352 are circumferentially disposed on the shaft 330. The first groove 350 is preferably disposed adjacent the second end 328 and a detent structure 370. In an embodiment, a plurality of detent structures or projections 370, 372 may be respectively disposed on a plurality of pliable legs 374 adjacent the second end 328 of the pin 324, the legs 374 being elastically depressible when an inwardly radial force is applied to the legs 374, as shown in FIG. 12. The second groove 352 is circumferentially disposed adjacent to the head 326. The grooves 350 and 352 are configured so that the grooves 350 and 352 respectively substantially align with the interiors edge 360 of the shackle 316 when the pin 324 is substantially inserted into the shackle 316. The alignment of the grooves 350 and 352 with the interior edge 360 of the shackle 316 creates a shear plane. As shown in FIG. 13, when a substantial lateral force is applied to the pin 324, the pin 324 will preferably shear at one or more of the grooves 350 and 352, decoupling the tongue 80 from the shackle 316 and avoiding or minimizing injury to a wearer of the article. In an embodiment, the clevis pin 324 shears at one or more of the groove 350 locations when approximately 30 to 100 pounds of force is applied. In an embodiment, the clevis pin 324 shears at approximately 60 pounds. When broken, the clevis pin 324 preferably disassembles into multiple pieces corresponding to the portions outside of the grooves and the portion disposed between the grooves, thereby allowing the article to fall apart.

It will be appreciated that each of the previously disclosed shackle and pin embodiments are compatible with an adjustable tongue 80 adapted to change the size of the woven corded article to be worn by a user. Referring to FIGS. 1 and 2, a tongue 80 is disposed at opposing end 13 of corded portion 12. The tongue 80 may be constructed of steel, plastic, carbon fiber, other metal or other strong material. In an embodiment, the tongue 80 is generally arcuate in shape, and includes a plurality of adjustment apertures 81, 82, 83, 84 extending through the width of the tongue 80. In an embodiment, the tongue 80 includes four adjustment apertures 81, 82, 83, 84. It will be appreciated that tongue 80 can have any number of adjustment apertures for adjustment purposes. The adjustment aperture 84 is preferably disposed adjacent opposing end 13 of corded portion 12 and is adapted to engage the tongue 80 with the cording 12. In an embodiment, the tongue 80 is coupled to the cording 12, such as for example, weaving the cording 12 by looping the cording 12 through aperture 84 one or more times to ensure a proper engagement between the tongue 80 and the cording 12. The other adjustment apertures 81, 82, 83 provide an adjustment mechanism whereby, the inner diameter of the bracelet or anklet 10 can be easily modified as desired to fit a user. In an embodiment, the adjustment apertures 81, 82, 83 are each disposed on the tongue 80 adjacent one another and spaced relative to each other in approximately ¼ inch increments throughout the length of the tongue 80 so that the diameter of the bracelet may be changed in ¼ inch increments for a total of ¾ inches depending on which adjustment aperture 81, 82, 83 is selected.

Though the following description refers to the embodiment shown in FIGS. 1 and 2, the interaction between the shackle 16 and tongue 80 is substantially identical for each embodiment discussed previously. To connect the shackle 16 to the tongue 80, the desired adjustment aperture 81, 82, or 83 of the tongue 80 is selectively substantially axially aligned with apertures 20, 22 of the shackle 16, depending on the desired inner diameter of the bracelet 10, and the pin 24 is inserted through one of the adjustment apertures 81, 82, or 83 in the tongue 80 to secure the two ends 11, 13 of the corded portion 12. When inserted, the pin 24 extends from aperture 20 at one end of the shackle 16, continuing through one of the adjustment apertures 81, 82 or 83 of the tongue 80, and is retained by aperture 22 at the opposing end of the shackle 16, thereby releasably coupling the tongue 80 to the shackle 16.

The tongue 80 and shackle 16 are adapted to substantially prevent the tongue 80 from extending past the arcuate portion 18 of the shackle 16 when the pin 24 is inserted through aperture 83, thereby adjusting the bracelet or anklet 10 to its shortest length. In an embodiment, the length of the interior of the shackle 16 is greater than the length of the tongue 80 from the tightest adjustment aperture 83 to the loosest adjustment aperture 81.

Figure 14:
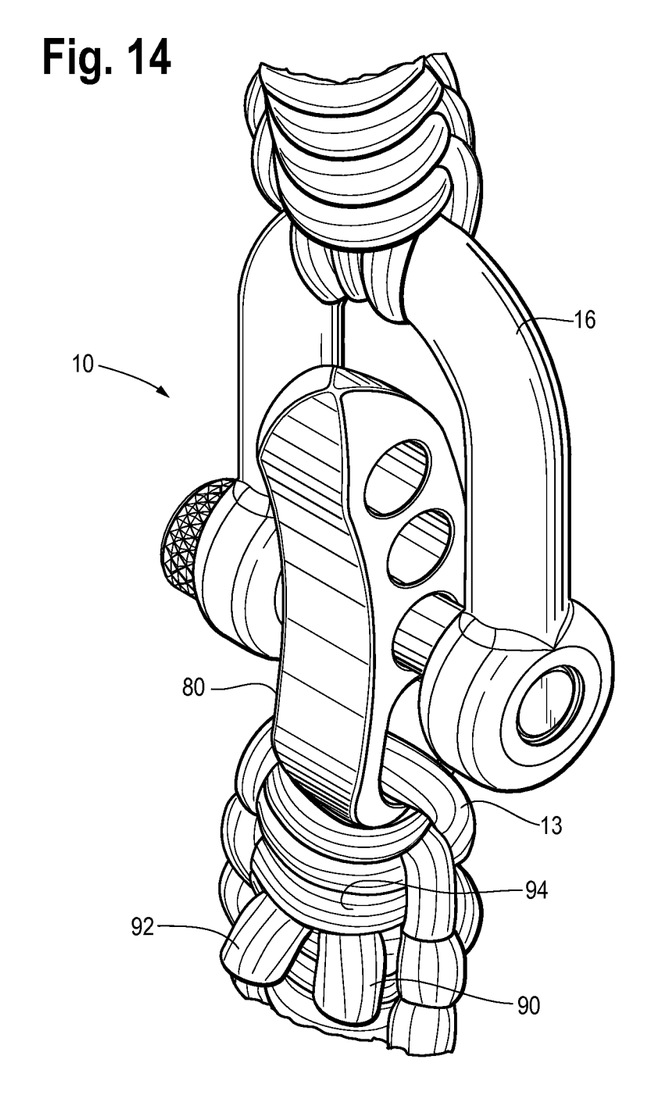
FIG. 14 is a rear perspective view of the bracelet, shackle, tongue and pin in FIG. 1.

Referring now to FIG. 14, the preferred paracord of the bracelet 10 is capable of use, such as, for example, in an emergency situation. To use the corded portion 12, which is preferably paracord, the shackle 16 and tongue 80 are disassembled. At the end 13 of the cord portion 12 coupled to the tongue 80, two loose ends 90 and 92 of corded portion 12 pass through a loop 94, as shown in FIG. 14. The loose ends 90 and 92 may be pulled outwardly from underneath the loop 94 and the remainder of the corded portion 12 can be unraveled. Once unraveled, the user will have, for example, between 10 to 28 feet of paracord, depending on the length and width of the article, which may be used for a plurality of purposes. Because the shackle 16 is weaved onto the corded portion 12, the shackle 16 may also be used to attach the unraveled corded portion 12 to an external object to ensure a secure connection between the cord and the object.

While the invention has been described with respect to specific examples including presently preferred modes of carrying out the invention, those skilled in the art will appreciate that there are numerous variations and permutations of the above described systems and techniques that fall within the spirit and scope of the invention

What is claimed is:

1. A wearable article, comprising:
   a body portion having first and second ends;
   a shackle having first and second arms with first and second shackle apertures respectively disposed thereon, the shackle coupled to the first end of the body portion; and
   a tongue adapted to be disposed between the first and second arms and having first and second tongue apertures and a third tongue aperture disposed between the first and second tongue apertures, a first portion of the tongue coupled to the second end of the body portion,
   wherein the second and third tongue apertures are adapted to be selectively substantially axially aligned with the first and second shackle apertures to receive an elongated pin through one of the second and third tongue apertures and the first and second shackle apertures, thereby releasably coupling the tongue with the shackle and causing the body portion to have a substantially annular shape.

2. The wearable article of claim 1, wherein the tongue further includes a fourth tongue aperture disposed between the first and second tongue apertures.

3. The wearable article of claim 2, wherein the second, third and fourth tongue apertures are adapted to be selectively axially aligned with the first and second shackle apertures to receive the pin.

4. The wearable article of claim 1, wherein the pin includes a head, a shaft, and a threaded end.

5. The wearable article of claim 4, wherein the first shackle aperture includes an inner wall having threads adapted to threadably engage the threaded end of the pin.

6. The wearable article of claim 4, wherein the pin includes an annular groove circumferentially disposed on the shaft of the pin.

7. The wearable article of claim 6, wherein the annular groove is disposed adjacent to an interior edge of the first arm when the pin is substantially fully inserted in the shackle and tongue apertures.

8. The wearable article of claim 7, wherein the pin is adapted to shear along the annular groove when approximately 30 to 100 pounds of force is applied to the pin.

9. The wearable article of claim 4, wherein the pin includes first and second annular grooves circumferentially disposed on the shaft of the pin, the first annular groove is disposed adjacent to an interior edge of the first arm and the second annular groove is disposed adjacent to an interior edge of the second arm when the pin is substantially fully inserted in the shackle and the tongue.

10. The wearable article of claim 1, wherein the shackle, tongue and pin are constructed of stainless steel.

11. The wearable article of claim 1, wherein the pin is constructed of a plastic material.

12. The wearable article of claim 1, wherein the body portion is constructed of paracord.

13. The wearable article of claim 1, wherein the pin includes a detent structure for detaining the pin in the shackle and tongue apertures when the pin is substantially fully inserted therein.

14. The wearable article of claim 1, wherein the body portion is a weaved corded portion.

15. The wearable article of claim 1, wherein the pin is a clevis pin.

16. A wearable article comprising:
a body portion having first and second ends;
a shackle having first and second arms with first and second shackle apertures respectively disposed thereon, the shackle coupled to the first end of the body portion; and
a tongue adapted to be disposed between the first and second arms and coupled to the second end of the body portion, the tongue having a first tongue aperture adapted to receive a connection portion therethrough, wherein the connection portion is adapted to releasably couple the first and second arms and the tongue together, thereby causing the body portion to have a substantially annular shape, the connection portion including an annular groove circumferentially disposed on a shaft of the connection portion and adapted to be disposed adjacent to an interior edge of the shackle when the connection portion is substantially fully inserted in the first and second shackle apertures and the first tongue aperture.

17. The article of claim 16, wherein the connection portion includes a tail having a detent structure disposed thereon for detaining the connection portion in the shackle and tongue apertures when the connection portion is substantially fully inserted therein.

18. The article of claim 17, wherein the detent structure includes a ball and a spring adapted to radially bias the ball outwardly.

19. The article of claim 16, wherein the connection portion includes a tail having a pair of pliable legs adapted to inwardly bend when being inserted into the first and second shackle apertures, each pliable leg having a projection adapted to detain the connection portion when the connection portion is substantially fully inserted into the shackle and tongue apertures.

20. The article of claim 16, wherein the tongue includes second and third tongue apertures.

21. The article of claim 19, wherein the first, second and third tongue apertures are each adapted to receive the connection portion by selectively axially aligning one of the first, second and third tongue apertures with the first and second shackle apertures.

22. The article of claim 20, wherein the annular groove of the connection portion is adapted to be disposed adjacent to an interior edge of the shackle when the connection portion is substantially fully inserted in the shackle and one of the second or third tongue apertures.

23. The article of claim 22, wherein the connection portion is adapted to shear along the annular groove when approximately 30 to 100 pounds of force is applied to the connection portion.

24. The article of claim 16, wherein the connection portion is constructed of a plastic material.

25. The article of claim 16, wherein the connection portion includes a shaft having first and second annular grooves circumferentially disposed thereon, the first annular groove is disposed adjacent to an interior edge of the first arm and the second annular groove is disposed adjacent to an interior edge of the second arm when the connection portion is substantially fully inserted in the shackle and the tongue apertures.

26. The article of claim 16, wherein the body portion is constructed of paracord.

27. The article of claim 16, wherein the first shackle aperture includes an inner wall having threads adapted to threadably engage threads disposed on the tail of the connection portion.

28. The wearable article of claim 16, wherein the body portion is a weaved corded portion.

29. The wearable article of claim 16, wherein the connection portion is a clevis pin.

30. A corded wearable article, comprising:
a weaved corded portion having first and second ends;
a shackle having first and second shackle arms and first and second shackle apertures respectively disposed on the first and second shackle arms, the shackle coupled to the first end of the corded portion; and
a tongue disposed between the first and second shackle arms and having a first tongue aperture and a plurality of adjustment apertures disposed thereon, the first tongue aperture adapted to couple the tongue to the second end of the corded portion, and one of the adjustment apertures is selectively substantially axially aligned with the first and second shackle apertures and is adapted to receive an elongated pin therethrough, the pin extending substantially between the first and second shackle arms when substantially fully inserted in the shackle and the tongue,
wherein the pin includes a head, a shaft, and a tail having a detent structure adapted to detain the pin in the first and second shackle apertures when substantially fully inserted in the shackle and tongue apertures, and an annular groove circumferentially disposed on the shaft of the pin and disposed adjacent to an interior edge of the first shackle arm when the pin is substantially fully inserted in the shackle and the tongue apertures thereby creating a shear plane for shearing the pin when a substantial lateral force is applied to the pin.

31. The corded wearable article of claim 30, wherein the corded portion includes a cord and is adapted to be disassembled by pulling one of a first and second end of the cord outwardly from underneath a loop of the corded portion and unraveling the cord.

32. A wearable article comprising:
a body having first and second body portions;
an arcuate shackle having first and second shackle apertures respectively disposed at first and second shackle ends, the first body portion coupled to the shackle; and
a tongue having a tongue aperture adapted to be selectively aligned with one of the first and second shackle apertures and to receive therein a connection portion to couple the tongue to the shackle, the second body portion coupled to the tongue, the connection portion including an annular groove circumferentially disposed on a shaft of the connection portion and adapted to allow the connection portion to shear along the annular groove.

33. The wearable article of claim 32, wherein the body is a cord including first and second cord ends each disposed proximate the shackle.

34. The wearable article of claim 32, wherein the body is a cord including first and second cord ends each disposed proximate the tongue.

\* \* \* \* \*